United States Patent
Deghel et al.

(10) Patent No.: US 11,711,800 B2
(45) Date of Patent: Jul. 25, 2023

(54) ENHANCED SCHEDULING REQUEST HANDLING PROCEDURE

(71) Applicant: Nokia Technologies Oy, Espoo (FI)

(72) Inventors: Matha Deghel, Paris (FR); Dawid Koziol, Wroclaw (PL); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 113 days.

(21) Appl. No.: 17/178,949

(22) Filed: Feb. 18, 2021

(65) Prior Publication Data
US 2021/0266934 A1 Aug. 26, 2021

(30) Foreign Application Priority Data
Feb. 21, 2020 (EP) ..................................... 20158805

(51) Int. Cl.
*H04W 72/1268* (2023.01)
*H04W 72/02* (2009.01)
*H04W 72/566* (2023.01)

(52) U.S. Cl.
CPC ....... *H04W 72/1268* (2013.01); *H04W 72/02* (2013.01); *H04W 72/569* (2023.01)

(58) Field of Classification Search
CPC .............. H04W 72/1268; H04W 72/02; H04W 72/1242
See application file for complete search history.

(56) References Cited

U.S. PATENT DOCUMENTS

| 2018/0035453 | A1  | 2/2018  | Yamada et al.            |
|--------------|-----|---------|--------------------------|
| 2019/0239283 | A1  | 8/2019  | Kwak et al.              |
| 2020/0367314 | A1* | 11/2020 | Belleschi ...... H04L 5/0078 |
| 2021/0212107 | A1* | 7/2021  | Lu ................. H04L 1/001 |
| 2022/0022252 | A1* | 1/2022  | Lee ............ H04W 24/08 |
| 2022/0039016 | A1* | 2/2022  | Terry ........... H04W 74/0808 |

FOREIGN PATENT DOCUMENTS

WO 2019/245779 A1 12/2019

OTHER PUBLICATIONS

3GPP TSG-RAN2 #106 R2-1905730 Reno, USA, May 13-17, 2019 Xiaomi Communications "Consideration on SR transmission" (Year: 2019).*
3GPP TSG-RAN WG2 #106 R2-1905614 Reno, USA, May 13-17, 2019 OPPO "SR for NR-U" (Year: 2019).*
"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.
"3rd Generation Partnership Project; Technical Specification Group Radio Access Network; NR; Medium Access Control (MAC) protocol specification (Release 16)", 3GPP TS 38.321, V16.3.0, Dec. 2020, pp. 1-156.

(Continued)

*Primary Examiner* — Kevin M Cunningham
(74) *Attorney, Agent, or Firm* — Harness, Dickey & Pierce, P.L.C.

(57) ABSTRACT

The present disclosure inter alia relates to an apparatus configured for performing a method, the method comprising: delivering, from a higher layer to a lower layer, an instruction to transmit a scheduling request; and at least partially controlling, by the lower layer, a selection of one or more resources for transmitting the scheduling request.

19 Claims, 8 Drawing Sheets

(56) References Cited

OTHER PUBLICATIONS

Extended European Search Report received for corresponding European Patent Application No. 20158805.0, dated Sep. 2, 2020, 11 pages.
"Discussion on SR procedure for NR-U", 3GPP TSG-RAN WG2 Meeting #105, R2-1900234, Agenda : 11.2.1.2, vivo, Feb. 25-Mar. 1, 2019, 4 pages.
"Intra UE prioritization between SR and PUSCH", 3GPP RAN WG2 Meeting #108, R2-1914880, Agenda : 6.7.3.3, InterDigital, Nov. 18-22, 2019, pp. 1-4.

\* cited by examiner

ENHANCED SCHEDULING REQUEST HANDLING PROCEDURE

RELATED APPLICATION

This application claims priority to European Application No. 20158805.1, filed on Feb. 21, 2020, which is incorporated herein by reference in its entirety.

TECHNOLOGICAL FIELD

The present disclosure relates to wireless communications, and more particularly to the transmission of scheduling requests, e.g. from a user equipment (UE) to a network base station (BS) for requesting radio resources.

BACKGROUND

In order to transmit uplink data from the UE to the network, resources for the uplink transmission may need to be allocated to the UE. In mobile communication networks, a scheduling request (also termed SR) is used by the UE to request the base station (e.g. a Node B in UMTS, eNB in LTE or gNB in a new radio (NR) system) to provide such resources for transmitting uplink data which arrived in the buffer of the UE. This approach may be required in case the UE has no uplink grant for an uplink data channel, such as the Physical Uplink Shared Channel (also termed PUSCH), which could also be used to request resources by transmitting a so called Buffer Status Report (also termed BSR). To avoid the situation where the UE is not able to transmit uplink data arriving in its buffer, the UE is configured with periodic resources of a control channel, e.g. the Physical Uplink Control Channel (also termed PUCCH), which are used to indicate data pending for transmission at the UE.

Presently, a scheduling procedure in a wireless system, for example in LTE or 5G NR, may take place as follows. The UE sends a Scheduling Request on PUCCH. The Network sends an UL Grant on PDCCH as downlink control information (also termed DCI). The UE will decode the DCI and check if there is any information addressed to it. The UE can then transmit data via PUSCH based on the resource allocation specified by DCI.

However, the resources used for SR transmission, such as the above mentioned PUCCH resources, are in general not exclusively used for SR transmission as the control channel may also carry other types of information. For instance, these resources may also be used for other kinds of uplink control information (also termed UCI), such as Channel State Indication (also termed CSI) or HARQ acknowledgments (also termed HARQ-ACK) and so on.

It is possible that different types of the aforementioned information are generated by the UE at a similar time. In order to ensure a certain reliability level of the control information, it is not always possible to use a single resource for transmitting all the generated information. To address this issue, prioritization rules were specified to decide which of the generated control information should have priority for using the resource. The prioritized information is then transmitted, and control signals/information of lower priority are dropped.

The SR and other information may be initiated by a higher layer (e.g. MAC layer) of the UE but transmitted by a lower layer (e.g. PHY layer) in the end.

For instance, in 3GPP Release 16, MAC layer prioritization was introduced between SR and PUSCH based on the priority of the logical channel(s) which triggered SR and the highest priority of the logical channels carried by PUSCH. This allows avoiding de-prioritization of the SR to some extent. The MAC layer, when doing the prioritization, is e.g. not aware of the PHY layer control traffic which may also collide with the SR. Since there is also prioritization at the PHY layer to cover such cases, the SR may be dropped eventually without the MAC knowing about that.

As a consequence of the dropping of the scheduling requests, the delivery of the scheduling request from the UE to the base station can be significantly delayed or even prohibited completely at least within a certain time period. Even though the technological background was explained above inter alia with respect to specific standards releases, this described problem of dropping of scheduling requests and the consequential delay in being allocated respective resources by the base station may occur generally in mobile communication networks irrespective of a specific standard or release.

Therefore, there inter alia exists the need for improving the delivery of scheduling requests. Thus, it may be an object of embodiments disclosed herein to improve the delivery of scheduling requests. It may further be an object of the embodiments to avoid a dropping of scheduling requests. It may further be an object of the embodiments to avoid a delay in delivery of scheduling requests.

SUMMARY OF SOME EXEMPLARY EMBODIMENTS

According to a first exemplary embodiment of the present disclosure, an apparatus configured for performing a method, is disclosed, the method comprising:
  delivering, from a higher layer to a lower layer, an instruction to transmit a scheduling request;
  at least partially controlling, by the lower layer, a selection of one or more resources for transmitting the scheduling request.

The apparatus may be an electronic device, such as a user equipment. The apparatus may in particular be a stationary device, such as a desktop computer or a mobile device, such as a smart phone, a tablet, a wearable, a smartwatch or the like. The method performed by the apparatus may in particular be the method of another aspect of the present disclosure.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

Thus, according to the first exemplary aspect of the present disclosure, there is also disclosed an apparatus comprising at least one processor and at least one memory including computer program code, the at least one memory and the computer program code configured to, with the at least one processor, cause an apparatus at least to perform and/or to control the method according to an exemplary aspect of the present disclosure.

The above-disclosed apparatus may be a module or a component for a device, for example a chip. The disclosed apparatus may comprise the disclosed components, for instance means, processor, memory, or may further comprise one or more additional components.

According to a second exemplary aspect of the present disclosure, a method, performed by at least one apparatus, is disclosed, the method comprising:

delivering, from a higher layer to a lower layer, an instruction to transmit a scheduling request;

at least partially controlling, by the lower layer, a selection of one or more resources for transmitting the scheduling request.

This method may for instance be performed and/or controlled by the apparatus according to the first aspect, for instance by a user equipment. Alternatively, the method may also be performed and/or controlled by more than one apparatus, for instance by a user equipment and a network. For instance, the method may be performed and/or controlled by using at least one processor of the apparatus.

According to a third exemplary aspect of the present disclosure, a computer program is disclosed, the computer program when executed by a processor of an apparatus causing said apparatus to perform a method comprising:

delivering, from a higher layer to a lower layer, an instruction to transmit a scheduling request;

at least partially controlling, by the lower layer, a selection of one or more resources for transmitting the scheduling request.

The apparatus may in particular be the apparatus according to the first aspect. The method may in particular be the method according to the second aspect. The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a fourth aspect of the present disclosure, a system comprising a user equipment and a network node is disclosed, wherein said user equipment and said node are configured to cooperate for performing a method, the method comprising:

at the user equipment, delivering, from a higher layer to a lower layer, an instruction to transmit a scheduling request to the network node;

at the user equipment, at least partially controlling, by the lower layer, a selection of one or more resources for transmitting the scheduling request to the network node.

In the following, exemplary features and exemplary embodiments of aspects of the present disclosure will be described in further detail.

A scheduling request may generally be understood as a request for scheduling resources so that a certain task, which may require resources, such as an uplink data transmission, can be performed subsequently. Specifically, a scheduling request may be understood to be a request for scheduling resources for sending uplink data. More specifically, a scheduling request may be understood as a special Physical Layer message (e.g. of the UE) to ask (e.g. the Network) to allocate respective resources. As presently implemented in the 3GPP communication standards, the allocation of resources in response to the scheduling request may be realized by sending an uplink grant or UL Grant so that the UE can transmit the uplink data, usually via a physical uplink shared channel (PUSCH). Thus, a scheduling request may be understood as a (in particular Uplink Physical Layer) message (in particular from the UE to the Network), indicating that a grant for certain resources is needed, e.g. that there is some data to be sent and that a resource grant for sending the data is desired.

When it is referred to a transmission of a scheduling request, this shall be generally understood as the process of sending out a physical signal of a scheduling request and does not necessarily require a reception of the scheduling request at the receiver or an acknowledgement thereof, as it is generally not known at the transmitter, whether the signal is received at by the designated receiver.

It should be noted, that even though a scheduling request itself, as presently implemented in mobile communication standards, is a kind of physical layer message, it is controlled by the MAC layer process (similar to many other physical layer channels controlled by the MAC layer).

A higher layer and a lower layer may in particular refer to layers as defined by the Open Systems Interconnection model (OSI model), which is a conceptual model that characterizes and standardizes the communication functions of a telecommunication or computing system without regard to its underlying internal structure and technology. According to the model, a communication system may be partitioned into seven abstraction layers. The original version of the model had seven layers. Generally, a layer serves the layer above it and is served by the layer below it. For example, a layer that provides error-free communications across a network provides the path needed by applications above it, while it calls the next lower layer to send and receive packets that constitute the contents of that path.

Accordingly, an instruction may be understood as a call to the next lower layer, in the present case specifically in order to instruct the next lower layer with processing the scheduling request. The instruction may be realized by delivering the scheduling request itself from the higher layer to the lower layer for transmission.

Controlling of the selection of one or more resources for transmitting the scheduling request by the lower layer is in particular understood to mean that the lower layer is able to or configured for using a respective resource for transmitting the scheduling request even though the lower layer was not specifically instructed to use the respective resource. In other words, the lower layer is given a flexibility in the selection of resources to use for transmitting or attempting to transmit the scheduling request. That the lower layer at least partially controls the selection of the one or more resources is understood to mean that the lower layer can nevertheless be instructed to use or try using a certain resource. For instance, if it is not possible to use an instructed resource for transmitting the scheduling request, the lower layer may make use of its capability of controlling a selection of one or more resources for transmitting the scheduling request.

A controlling of a selection of one or more resources may in a non-limiting example comprise selecting the next possible resource for trying to transmit the scheduling request on the respective resource(s). This may be repeated until the schedule request can be transmitted, for instance. However, controlling a selection may also comprise more complex selection criteria. For instance, controlling a selection may in particular rely on timers and/or re-attempt limits, as will be explained in more detail below. Also, controlling a selection may comprise mathematical calculations in order to identify the resource(s) to be used for transmitting the schedule request.

A resource (both a resource for transmitting a scheduling request and a resource to be allocated by means of the schedule request) may for instance be or comprise one or more resource elements, for instance one or more resource blocks. For instance, a resource may be a certain part of a resource grid. A resource may for instance be a certain segment in the time and frequency domain. A resource may for instance be defined by means of frames, symbols, slots and/or subcarriers.

A user equipment may be understood as any device used directly by an end-user to communicate with a network. It can be a hand-held telephone, a laptop computer equipped with a mobile broadband adapter, or any other device.

Accordingly, the network may be understood as the system communicating with the user equipment. In non-limiting examples, the network may in particular be a Universal Mobile Telecommunications System (UMTS) or a 3GPP Long Term Evolution (LTE) system or 5G systems or any other mobile communications system defined by future standards, in particular successors of the present 3GPP standards.

Due to allowing the lower layer the flexibility to choose a resource for sending the scheduling request, in many cases an undesired dropping of the scheduling request could be avoided. In consequence, the delay of delivering the scheduling request to the base station of the network is decreased by avoiding the need to wait for the higher layer in the UE to reattempt to send the scheduling request. As will also be explained in more detail below, the proposed solution could be used with and without a signaling from the lower layer to the higher layer about whether scheduling request is transmitted.

According to an exemplary embodiment of aspects of the present disclosure, the higher layer is a data link layer, in particular a MAC layer. A data link layer is in particular understood to be the second layer of the seven-layer OSI model of computer networking (layer 2). This layer may be understood as the protocol layer that transfers data between network nodes in a network segment. The data link layer may provide the functional and procedural means to transfer data between network entities and might provide the means to detect and possibly correct errors that may occur in the physical layer.

More specifically, the higher layer may be a medium access control (MAC, also called media access control) layer, which may be a sublayer of the data link layer. This sublayer in particular controls the hardware responsible for interaction with the wired, optical or wireless transmission medium. The MAC sublayer and the logical link control (LLC) sublayer together may be considered to make up the data link layer. Within the data link layer, the MAC layer provides flow control and multiplexing for the transmission medium.

According to an exemplary embodiment of aspects of the present disclosure, the lower layer is a physical layer (also termed PHY layer). In the seven-layer OSI model of computer networking, the physical layer or layer 1 is the first and lowest layer. This layer may be implemented by a PHY chip, for instance. Generally, the physical layer consists of the electronic circuit transmission technologies of a network. It is a fundamental layer underlying the higher level functions in a network, and can be implemented through a great number of different hardware and software technologies with widely varying characteristics. Thus, the physical layer may be seen as defining the means of transmitting raw bits rather than logical data packets over a physical data link connecting network nodes (such as the user equipment and the base station). The bitstream may be grouped into code words or symbols and converted to a physical signal that is transmitted over a transmission medium. The physical layer may thus provide an electrical, mechanical, and procedural interface to the transmission medium. In other words, the physical layer translates logical communications requests from the data link layer into hardware-specific operations to cause transmission or reception of electronic signals.

The MAC layer is not always aware of collisions or overlap in information to be sent in the physical layer. Only at the physical layer these collisions or overlap will be determined. A scheduling request will then often need to be dropped. By allowing the physical layer to control the selection of resources for transmitting the scheduling request, the scheduling request may still be transmitted successfully with different selected resources.

According to an exemplary embodiment of aspects of the present disclosure, the one or more resources for transmitting the scheduling request belong to a physical uplink control channel. A physical uplink control channel may be understood as a channel carrying uplink control information (UCI). As already mentioned, information carried by a physical uplink control channel may not only be limited to scheduling requests but also extend to other control information, such as Hybrid automatic repeat request (negative) acknowledgments (HARQ ACK/NACK), or channel state information (CSI), in particular including at least one of a channel quality indicator (CQI), a precoding matrix indicator (PMI), a precoding type indicator (PTI) and rank indication (RI). The described approach has the advantage, that the lower layer can control the resource selection in case of a collision of a scheduling request with one of the other information to be sent.

According to an exemplary embodiment of aspects of the present disclosure, the scheduling request is a scheduling request for allocating one or more resources for an uplink transmission, in particular for allocating one or more resources of a physical uplink shared channel. For instance, a physical uplink shared channel carries uplink data that the apparatus tries to send. It may however also carry/piggy-back further information, such as HARQ-ACK feedback for the downlink data the apparatus has received in addition to uplink data.

According to an exemplary embodiment of aspects of the present disclosure, the instruction to transmit the scheduling request specifies one or more resources to be used for transmitting the scheduling request and wherein the method further comprises:

determining, by the lower layer, whether the scheduling request overlaps with a higher priority information to be transmitted over the one or more resources specified by the instruction.

As already mentioned, the lower layer may first try to transmit the scheduling request on resources specified by the instruction. In case the scheduling request can be transmitted using the specified resources there is no requirement for further controlling the selection of resources by the lower layer. However, if it is determined, by the lower layer, that the scheduling request overlaps with a higher priority information to be transmitted over the one or more resources specified by the instruction (such as a HARQ-ACK/NACK or data to be sent over a physical uplink shared channel), the lower layer may then continue to control the selection of the one or more resources for transmitting the scheduling request in a preconfigured manner without any further instructions by the higher layer.

Higher priority information is understood as information having a higher priority than the scheduling request. Thus, when the scheduling request and the higher priority information collide or overlap for transmission over the one or more resources specified by the instruction, the scheduling request information is typically dropped (i.e. not sent) in favor of the higher priority information. As examples, such information with a higher priority may be a HARQ-ACK/NACK or data to be sent over a physical uplink shared channel.

According to an exemplary embodiment of aspects of the present disclosure, the controlling of the selection of the one or more resources for transmitting the scheduling request allows for attempting, by the lower layer, to transmit the scheduling request on more than one resource. For instance, the lower layer may attempt transmitting the scheduling request repeatedly until the scheduling request is transmitted successfully. As already mentioned, the lower layer may first try to transmit the scheduling request by using the resource(s) specified by the instruction received from the higher layer. If this is not successful, further resources may be selected for transmitting the scheduling request.

According to an exemplary embodiment of aspects of the present disclosure, the controlling of the selection of the one or more resources for transmitting the scheduling request comprises postponing or re-attempting, by the lower layer, the transmission of the scheduling request. For instance, when the lower layer cannot transmit the scheduling request with a resource e.g. specified by the higher layer or selected by the lower layer itself, the lower layer may for instance directly re-attempt to transmit the scheduling request by using the next resource. The lower layer may also postpone transmitting the scheduling request, e.g. for a certain time.

According to an exemplary embodiment of aspects of the present disclosure, the re-attempting, by the lower layer, of the transmission of a scheduling request is limited to a maximum number of attempts. For instance, the lower layer may be configured with a counter and a predefined limit for the counter indicating a maximum number of attempts for transmission of the scheduling request. Specifically, after the higher layer instructs the lower layer to transmit the scheduling request, the lower layer then attempts to transmit the scheduling request the configured number of times. In case the scheduling request can be transmitted, the lower layer may report to the higher layer that the scheduling request has been transmitted. However, if the maximum number of attempts is reached without the lower layer being able to transmit the scheduling request, the lower layer may wait until the higher layer re-delivers the scheduling request.

According to an exemplary embodiment of aspects of the present disclosure, the lower layer comprises a timer for controlling the selection of the one or more resources for transmitting the scheduling request. A timer is an effective means for advantageously influencing the controlling of the selection of the one or more resources for transmitting the scheduling request. In particular, a coordination or harmonization of the behavior of the lower layer with that of the higher layer can be effectively achieved by defining a timer for the lower layer.

According to an exemplary embodiment of aspects of the present disclosure, the timer of the lower layer is a repetition timer and wherein the controlling of the selection of the one or more resources for transmitting the scheduling request comprises attempting, by the lower layer, to transmit the scheduling request until an expiry of the repetition timer. A repetition timer may avoid too many attempts of transmitting the scheduling request by the lower layer. Specifically, since the higher layer may at some point re-deliver the instruction to transmit the scheduling request, if it cannot be transmitted, it is advantageous to limit the time for attempts initiated by the lower layer. In one embodiment, the timer of the lower layer can be expressed as absolute time, for example 10 ms. For instance, the timer may have a fixed predetermined value or the value or the timer may be dynamically chosen, e.g. depending on the circumstance.

The higher layer may comprise a prohibit timer for temporarily prohibiting re-delivering, from the higher layer to the lower layer, the instruction to transmit the scheduling request. A prohibit timer may prevent too many and too soon re-deliveries by the higher layer of the instruction to transmit the scheduling request. Specifically, a re-delivery of the instruction to transmit the scheduling request is not necessary as long as the lower layer attempts to transmit the scheduling request.

According to an exemplary embodiment of aspects of the present disclosure, the repetition timer of the lower layer is defined at least based on the prohibit timer of the higher layer. The prohibit timer of the higher layer and the repetition timer of the lower layer can advantageously be coordinated and harmonized in this way. The respective timers may be configured such that the higher layer does at least not re-deliver the instruction for transmitting the scheduling request as long as the lower layer is attempting to transmit the scheduling request.

According to an exemplary embodiment of aspects of the present disclosure, the repetition timer of the lower layer is substantially equal to the prohibit timer of the higher layer. For instance, the prohibit timer of the higher layer may start when the higher layer delivers the instruction to transmit the scheduling request. The repetition timer may start substantially at the same time, e.g. when receiving the instruction from the higher layer. In this case, the repetition timer of the lower layer may thus start and end substantially at the same time as the prohibit timer of the higher layer. During the prohibit timer of the higher layer, the lower layer thus tries to transmit the scheduling request. After expiry of the repetition timer, the lower layer stops attempting to transmit the scheduling request. Since the prohibit timer has expired as well, the higher layer will re-deliver the instruction to transmit the scheduling request to the lower layer, at least in case the scheduling request is still pending.

The term substantially (the timers are substantially equal or starting/ending substantially at the same time) is understood to mean that the respective timers may have a small difference or offset in particular due to a time for communicating between the layers, for instance.

In an alternative exemplary embodiment of aspects of the present disclosure, the repetition timer of the lower layer is shorter than the prohibit timer of the higher layer. Here, in case the lower layer does not manage to transmit the scheduling request before the defined timer expires or due to prioritization at the lower layer, it may be advantageous when the lower layer informs the higher layer that the scheduling request was not transmitted. In this case, the prohibit timer of the higher layer may be stopped, so that further attempts to transmit the scheduling request may be initiated before waiting for the expiry of the prohibit timer in order to avoid unnecessary delay.

According to an exemplary embodiment of aspects of the present disclosure, the repetition timer of the lower layer starts substantially at the same time as the prohibit timer of the higher layer. This aligns the behavior of the lower layer and the higher layer. As explained above, this has the advantage that the higher layer refrains from re-delivering the instruction to transmit the scheduling request, when the lower layer starts attempting to transmit the scheduling request.

According to an exemplary embodiment of aspects of the present disclosure, the repetition timer of the lower layer ends substantially at the same time as the prohibit timer of the higher layer. This aligns the behavior of the lower layer and the higher layer. As explained above, this has the advantage that the higher layer may re-deliver (if it is still pending) the instruction to transmit the scheduling request, when the lower layer stops attempting to transmit the scheduling request.

According to an exemplary embodiment of aspects of the present disclosure, the method further comprises:
in case the scheduling request has been transmitted, reporting or refrain from reporting, by the lower layer to the higher layer, that the scheduling request has been transmitted.

If it is reported that the scheduling request has been transmitted, the higher layer may take appropriate actions. For instance, the higher layer may reset the prohibit timer, as explained below in more detail. Refraining from reporting that the scheduling request has been transmitted may reduce inter-layer communication. Also, according to a further exemplary embodiment, which will also be explained in more detail below, the higher layer may comprise a counter (which may be termed "SR_COUNTER") for limiting the number of times of delivering the instruction for transmission of the scheduling request to the lower layer. For this, a predefined value indicating the maximum number of transmissions may be defined (also termed "sr-TransMax"). The counter may increase when it is reported that the scheduling request has been transmitted. This will prevent an increase of this counter of the higher layer (and thus a premature releasing of the connection) even though the scheduling request has not been transmitted.

In case it is it refrained from reporting to the higher layer, that the scheduling request has been transmitted, the higher layer may re-deliver the instruction to transmit the scheduling request even though this would not be required. Thus, in an exemplary embodiment, the lower layer may discard a re-delivery of an instruction to transmit the scheduling request (e.g. for a predefined time window).

According to an exemplary embodiment of aspects of the present disclosure, the method further comprises:
in case it is reported, by the lower layer to the higher layer, that the scheduling request has been transmitted, resetting, by the higher layer, the prohibit timer of the higher layer.

Resetting the prohibit timer (i.e. setting the timer back to 0 and thus effectively extending the timer) avoids re-delivering the instruction to transmit the scheduling request to the lower layer too early. This may provide sufficient time for the network to reply to the scheduling request, since the scheduling request may have been transmitted later (e.g. after a few attempts by the lower layer, which the higher layer may not be aware of) than the instruction was delivered from the higher layer.

According to an exemplary embodiment of aspects of the present disclosure, the method further comprises:
refraining, by the higher layer, from incrementing a counter for counting the number of times of delivering the instruction for transmission of the scheduling request to the lower layer until it is reported, by the lower layer to the higher layer, that the scheduling request has been transmitted.

As already mentioned above, the counter may be termed "SR_COUNTER" and can be used by the higher layer in combination with a value indicating the maximum number of transmissions (mentioned as "sr-TransMax" above) to control the maximum number of scheduling requests a UE may transmit before resigning from further attempts to deliver it to the network. In other words, said counter (i.e. the value thereof) is only increased if it is reported that the scheduling request has actually been transmitted. In contrast to a situation where the counter is incremented by the higher layer each time higher layer delivers the scheduling request for transmission to the lower layer, the suggested embodiment is advantageous because, as has been explained before, the higher layer may not be aware that lower layer dropped the scheduling request without attempting to transmit it. Hence, with the suggested embodiment, it may be possible to avoid that the counter is incremented unnecessarily.

According to an exemplary embodiment of aspects of the present disclosure, wherein the method further comprises:
in case the scheduling request could not be transmitted, reporting or refrain from reporting, by the lower layer to the higher layer, that the scheduling request could not be transmitted.

If it is reported that the scheduling request could not be transmitted, the higher layer may take appropriate actions. For instance, the higher layer may stop the prohibit timer, as explained below in more detail.

According to an exemplary embodiment of aspects of the present disclosure, the method further comprises:
in case it is reported, by the lower layer to the higher layer, that the scheduling request has not been transmitted, stopping, by the higher layer, the prohibit timer of the higher layer.

Stopping the prohibit timer (i.e. acting as if the timer would have expired) allows re-delivering of the instruction to transmit the scheduling request to the lower layer to take place again. This is of particular advantage in case the repetition timer is shorter and ends earlier than the prohibit timer, because the higher layer does in this way not need to wait for the regular expiry of the timer, which avoids unnecessary delay in re-delivering, to the lower layer, the instruction to transmit the scheduling request and in the end avoids unnecessary delay in re-attempting to transmit the scheduling request by the lower layer.

According to an exemplary embodiment of aspects of the present disclosure, the method further comprises:
in case it is reported, by the lower layer to the higher layer, that the scheduling request has not been transmitted, re-delivering, from the higher layer to the lower layer, the instruction to transmit the scheduling request.

As already explained above, configuring the higher layer with this behavior avoids unnecessary delay in re-delivering, to the lower layer, the instruction to transmit the scheduling request and in re-attempting to transmit the scheduling request by the lower layer.

According to an exemplary embodiment of aspects of the present disclosure, the method further comprises:
in case it is reported, by the lower layer to the higher layer, that the scheduling request has not been transmitted, decrementing, by the higher layer, a counter for counting the number of times of delivering the instruction for transmission of the scheduling request to the lower layer.

As explained above, the counter (e.g. SR_COUNTER) can be used by the higher layer in combination with a maximum value (e.g. sr-TransMax) to control the maximum number of scheduling requests a UE may transmit before resigning from further attempts to deliver it to the network. When the counter reaches a maximum number configured by the network (e.g. sr-TransMax), the UE releases some of its configurations (e.g. PUCCH) and initiates random access procedure.

According to an exemplary embodiment of aspects of the present disclosure, the apparatus is a user equipment or a part thereof and/or the scheduling request is directed to a network node. Thus, the actions described herein according to aspects may in particular be performed by and at a user equipment. In the end, the scheduling request may be successfully transmitted to the network node, such as a base station, e.g. a base station of a cellular network, such as may for example be mobile phone network like a 2G/3G/4G/5G cellular communication network or any other cellular communication networks, in particular successors of 5G. The 2G/3G/4G/5G cellular radio communication standards are developed by the 3GPP and presently available under http://www.3gpp.org/. However, the present disclosure may likewise be applicable to other kinds of networks, such as non-cellular networks.

The network node (e.g. base station) may then allocate resources to the user equipment, e.g. resources of an uplink data channel. The user equipment may then use these allocated resources to transmit data to the network.

It is to be understood that the presentation of the embodiments disclosed herein is merely by way of examples and non-limiting.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present disclosure and shall be understood to complement and be read together with the description of example embodiments of the present disclosure as provided in the above SUMMARY section of this specification.

Embodiments of these teachings relate to the triggering and transmission of scheduling requests in a radio system. While the specific radio system in the examples below is 5G, this is a non-limiting embodiment.

Figure 1:
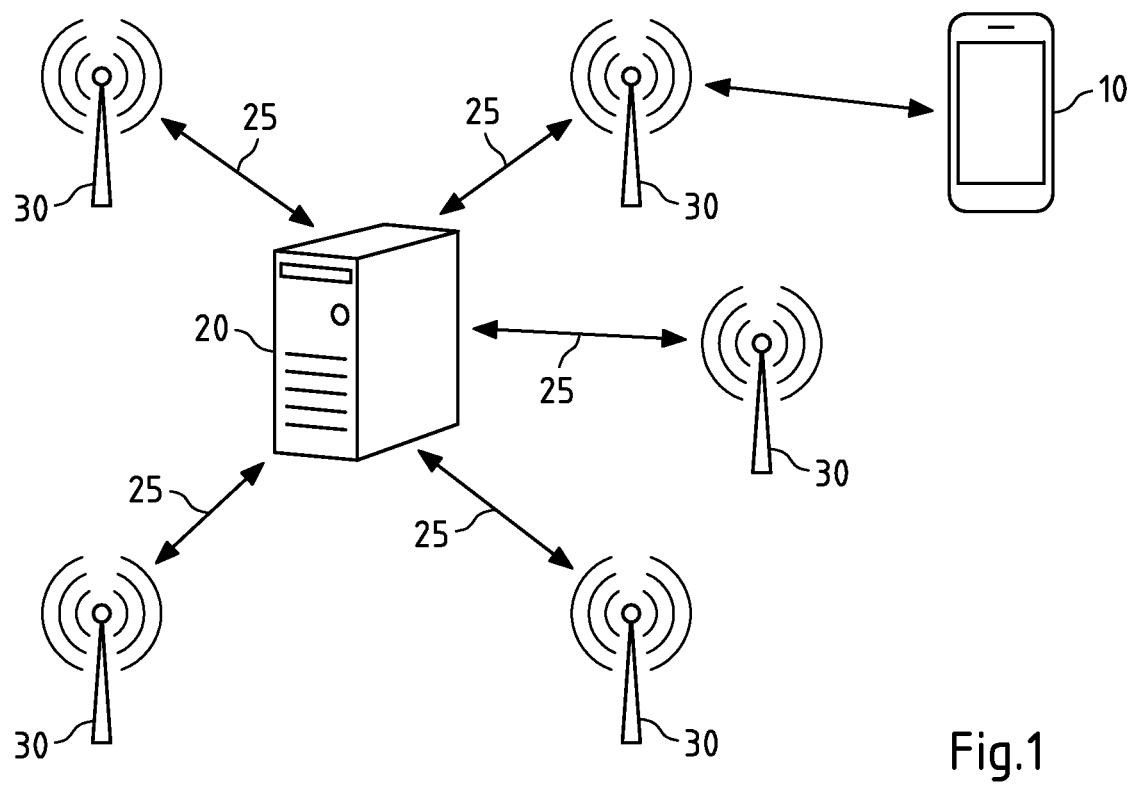
FIG. 1 is a schematic diagram illustrating an example radio environment in which exemplary embodiments of the present disclosure may be performed.

FIG. 1 is a schematic overview of an example 5G radio environment (also termed new radio (NR) system), in which these teachings may be deployed. The 5G system is to operate in both low and high frequency bands, and is targeted to serve enhanced mobile broadband (eMBB) and massive machine-type communications (mMTC) with ultra-reliability and ultra-low latency (URLLC). In contrast to some cellular base stations/eNBs (such as 4G), the 5G system is to have the base station provided as a baseband unit (BBU) 20 (which may be implemented as a single BBU or multiple interconnected BBUs) and one or more remote radio heads (RRHs) 30 each located up to a few kilometers from the BBU 20. Each RRH 30 is operationally connected to its BBU 20 via a wired or wireless bidirectional transmission link 25 referred to as a front haul (FH) link. Currently the BBU/RRH combination in 5G systems is referred to as a gNB. The illustrated UE 10 is in direct communication with the RRH 30, which in the 5G system would be operating as a transmission/reception point (TRP) of the gNB. The UE 10 may have active connections to more than one RRH 30.

In both, the 5G but also some wireless networks such as LTE (also known as 4G), when a UE has uplink data to send, for example when it is on an active voice call or interacting with a social media platform, the user equipment will send a scheduling request to its serving base station such as eNB or gNB on the PUCCH. For this, the UE is configured with periodic PUCCH resources, which are used to indicate data pending for transmission at the UE in order to avoid the situation where the UE is not able to transmit uplink data arriving in its buffer. The base station can respond with a PDCCH that allocates to the user equipment uplink radio resources on the PUSCH. If the UE already has an uplink grant for PUSCH, these resources can used to transmit a Buffer Status Report (BSR) for resource allocation. If the UE has uplink data but does not yet have a network connection or does not have uplink synchronization or is not configured with the scheduling request resources on the PUCCH, the user equipment can also send its scheduling request via a random access procedure it uses to obtain such a connection or uplink synchronization or the uplink radio resources for data transmission.

In terms of the layer architecture, transmitting a scheduling request is realized in that the medium access control layer (MAC) instructs the physical layer (PHY) to transmit a respective scheduling request. Therein, MAC indicates to PHY the resource that should be used for the SR transmission.

Information elements related to the MAC layer SR configuration, which are described in 3GPP TS 38.331, define a prohibit timer ("sr-ProhibitTimer") as a timer that delays retransmissions of scheduling requests, and a maximum number of scheduling request transmissions ("sr-TransMax"), which can be transmitted before the UE decides that the uplink is lost.

It is important to note that PUCCH resources are in general not exclusively used for scheduling request transmission as PUCCH may carry other types of uplink control information (UCI) such as Channel State Indication (CSI), HARQ acknowledgments (HARQ-ACK), etc. It often happens that different types of control information are generated by the UE at a similar time. In order to ensure a certain reliability level of the control information, it is not always possible to use a single PUCCH resource for transmitting all the generated information. To address this issue, prioritization rules were specified to decide which of the generated control information should have priority for using the PUCCH resource. The prioritized information is then transmitted, and control signals/information of lower priority are dropped.

More generally, in 3GPP Release 16 NR, RAN1 and RAN2, it was analysed how to address an overlapping of different types of control and data information, which is referred to as intra-UE prioritization/multiplexing.

The general agreements in 3GPP Release 16 NR related to intra-UE multiplexing/prioritization are summarized below:
  Introduce a parameter that reflects the requirements of a physical channel, i.e. PHY channel's priority.
  Design new rules in PHY layer for handling overlapping PHY channels (if needed) taking into account the above parameter.
  Design new rules in MAC layer for handling multiple overlapping PUSCH grants and PUSCH grants overlapping with Scheduling Request.

From a RAN2 perspective, the main agreements are as follows:
  PUSCH vs. SR, CG PUSCH vs. CG/DG PUSCH: Prioritization is done by comparing the priorities of the corresponding logical channels (LCH) at MAC layer.
  Only one MAC PDU (with higher priority) delivered to PHY in case timeline allows which prevents PHY layer collisions from happening.
  Enhanced LCP mapping restrictions by taking into account grant priority (PHY priority indication is reused for this purpose).

From RAN1 perspective, the main agreements are summarized below:
  PHY priority: for most of the channels, support two-level priority (high or low) intended for two different service types known at PHY layer in Rel-16.
  Handling rules among low-priority channels: reuse the Rel-15 mechanism.
  Handling rules among high-priority channels: reuse Rel-15 rules as a basis.
  High-priority channel vs. low-priority channel: Drop the low-priority UL transmission.

With the above agreements related to intra-UE prioritization/multiplexing, there are scenarios where the scheduling request transmission is dropped/cancelled due to prioritization at the PHY layer. Specifically, under such scenarios, the scheduling request transmission collides with another transmission, and the PHY layer decides to drop the scheduling request transmission, where the prioritization decision essentially depends on the identity and/or priority of the colliding channels.

One of the scenarios where dropping of scheduling requests at the PHY layer could happen is a scheduling request is colliding with an HARQ-ACK, or more generally, a scheduling request is colliding with any channel/transmission not visible to the MAC layer. In this case, for instance, the indicated scheduling request resource for transmission collides with the HARQ-ACK resource, and if HARQ-ACK is prioritized over scheduling request, then the scheduling request is dropped at the PHY layer. While there are cases where SR and HARQ-ACK could be multiplexed, this is not always possible. Note that the MAC layer is not aware of how long the HARQ-ACK resource is, or how many HARQ-ACK transmissions there are or are expected, and whether the corresponding HARQ-ACK resources collide with the next SR resources or not. In other words, HARQ-ACK transmissions and their corresponding resources are not visible to the MAC layer. This could result in dropping the scheduling request again (and again) at the PHY layer after the MAC layer has re-delivered the scheduling request for transmission.

Another scenario that could lead to dropping the scheduling request at the PHY layer is a collision or overlap of the scheduling request and PUSCH. Specifically, after the scheduling request is delivered to the PHY layer, a PUSCH may come in (i.e. the PDU of the PUSCH is delivered from the MAC to the PHY layer), where the PUSCH resource collides with the scheduling request resource. Since PUSCH is of higher or equal priority compared to scheduling request (at least from a MAC layer perspective, otherwise it would not have been delivered to the PHY layer), the scheduling request transmission is cancelled/dropped. While it is possible that, in the future, multiplexing of scheduling requests on PUSCH will be allowed, this would, however, only work for specific scenarios, and thus the dropping of scheduling requests due to overlap with PUSCH would still occur.

Considering the scenarios that could lead to dropping a scheduling request at the PHY layer, it can happen that the MAC layer re-delivers the scheduling request multiple times to the PHY layer, however, each time the scheduling request is dropped at the PHY layer. This issue could negatively impact the system performance at least in terms of latency, particularly when the scheduling request is dropped several consecutive times at the PHY layer. Furthermore, as explained above, the MAC layer maintains a prohibit timer, which is started upon providing the scheduling request to the PHY layer for transmission. As long as the timer is running, the MAC layer is not allowed to re-attempt sending the scheduling request, which increases the scheduling request delay even more in an unnecessarily manner in case the PHY layer did not transmit it.

Figure 2:
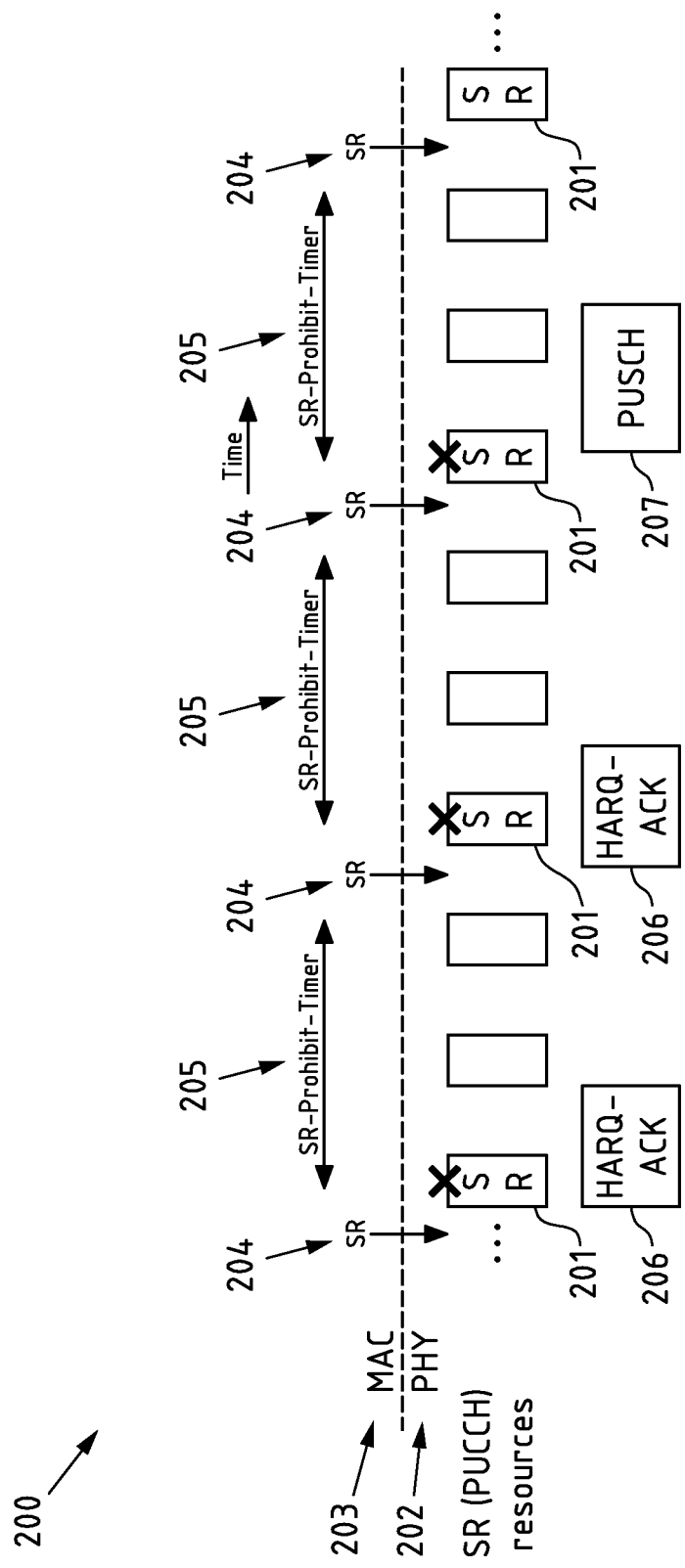
FIG. 2 is a schematic diagram of the MAC layer and physical layer of a UE illustrating a non-inventive embodiment, where the scheduling request is dropped three consecutive times at the PHY layer due to channel collision and prioritization.

To better illustrate this issue, FIG. 2 shows a schematic diagram 200 of the MAC layer and PHY layer of a UE illustrating a non-inventive embodiment, where the scheduling request 201 is dropped three consecutive times at the PHY layer 202 due to channel collision and prioritization. The MAC layer 203 repeatedly delivers an instruction 204 to the PHY layer 202 after expiry of the scheduling request prohibit timer "SR-Prohibit-Timer" 205. In this example, the scheduling request 201 is dropped over three consecutive transmission opportunities at the PHY layer 202 due to prioritization, before it gets transmitted at the fourth attempt. In the first two attempts the scheduling request 201 is dropped due to overlap with a HARQ-ACK 206, while at the third attempt the scheduling request is dropped due to an overlap with PUSCH 207. This example shows how the issue explained above could negatively impact the latency performance, as it may cause large delays in transmitting the scheduling request.

It has been found that the above issue can be considered as being caused by the fact that the MAC layer decides the exact resource for scheduling request transmission and instructs the PHY layer to send the scheduling request on this specific resource, i.e. the PHY layer does not have any control on which resource to use for the scheduling request transmission. And the MAC layer is not able to avoid the channels collision at the PHY layer since, as explained earlier, the MAC layer is either not aware of such a collision or it knows about the collision only after delivering the scheduling request to the PHY layer.

As already briefly mentioned above, in 3GPP Release 16, a MAC layer prioritization was introduced between scheduling request and PUSCH traffic based on the priority of the logical channel(s) which triggered the scheduling request and the highest priority of the logical channel(s) carried by PUSCH, which is explained in more detail in 3GPP R2-1916352. This allows avoiding deprioritization of the scheduling request to some extent (at the PHY layer), but as also explained above, the MAC layer, when doing the prioritization, is e.g. not aware of the PHY layer control traffic which may also collide with the scheduling request. Since there is also prioritization at the level of the PHY layer to cover such cases, the scheduling request may be dropped eventually without the MAC layer knowing about that.

While the above problem could potentially be mitigated for instance by not setting the scheduling request prohibit timer or setting it to a very short value, in which case the MAC layer would quickly re-deliver the scheduling request to the PHY layer for each PUCCH resource applicable to this scheduling request. However, such an approach would have the issue that there is no time for the network to reply to the SR, thus over the air signalling may increase unnecessarily. Additionally, in case the scheduling request is dropped and not transmitted by the PHY layer, then the MAC layer still increments the counter for the maximum number of scheduling request transmissions (sr-TransMax counter), even though the SR has not been transmitted. This may lead to premature and unnecessary actions such as releasing all the PUCCH configurations, SRS etc. and the UE would need to initiate a Random-Access Procedure.

With respect to FIG. 3-5, exemplary embodiments of the present disclosure will now be described in more detail. In these embodiments the lower, i.e. here the physical layer is given control in the selection of resources for the transmission of the scheduling request. In other words, the PHY layer in the UE may be configured in a way that gives the PHY layer flexibility to attempt transmitting the scheduling request delivered from the higher layer, i.e. here the MAC layer, on more than one SR resource, where the PHY layer selects the suitable resource(s) for the SR transmission. In this way, the PHY layer could avoid channels collision in case it would lead to dropping the scheduling request and could thus postpone the scheduling request transmission to upcoming/next SR resource(s) where there is no risk of dropping the SR.

In the following embodiments, in order to control the PHY layer behaviour accordingly, a repetition timer is configured, where the PHY layer attempts transmitting the scheduling request on the available scheduling request resources before this timer expires. In these embodiments this timer is started when the scheduling request is delivered from the MAC layer to the PHY layer. The repetition timer may be configured per scheduling request configuration or per logical channel. The MAC layer may also provide the scheduling request configuration to the PHY layer for configuring the repetition timer. However, it is noted that there are generally other possibilities than a repetition timer (such as counters or time window or more complex algorithms) for influencing the PHY layer behaviour accordingly and thus realizing a controlling of the selection of resources by the PHY layer for scheduling request transmissions.

Figure 3A:
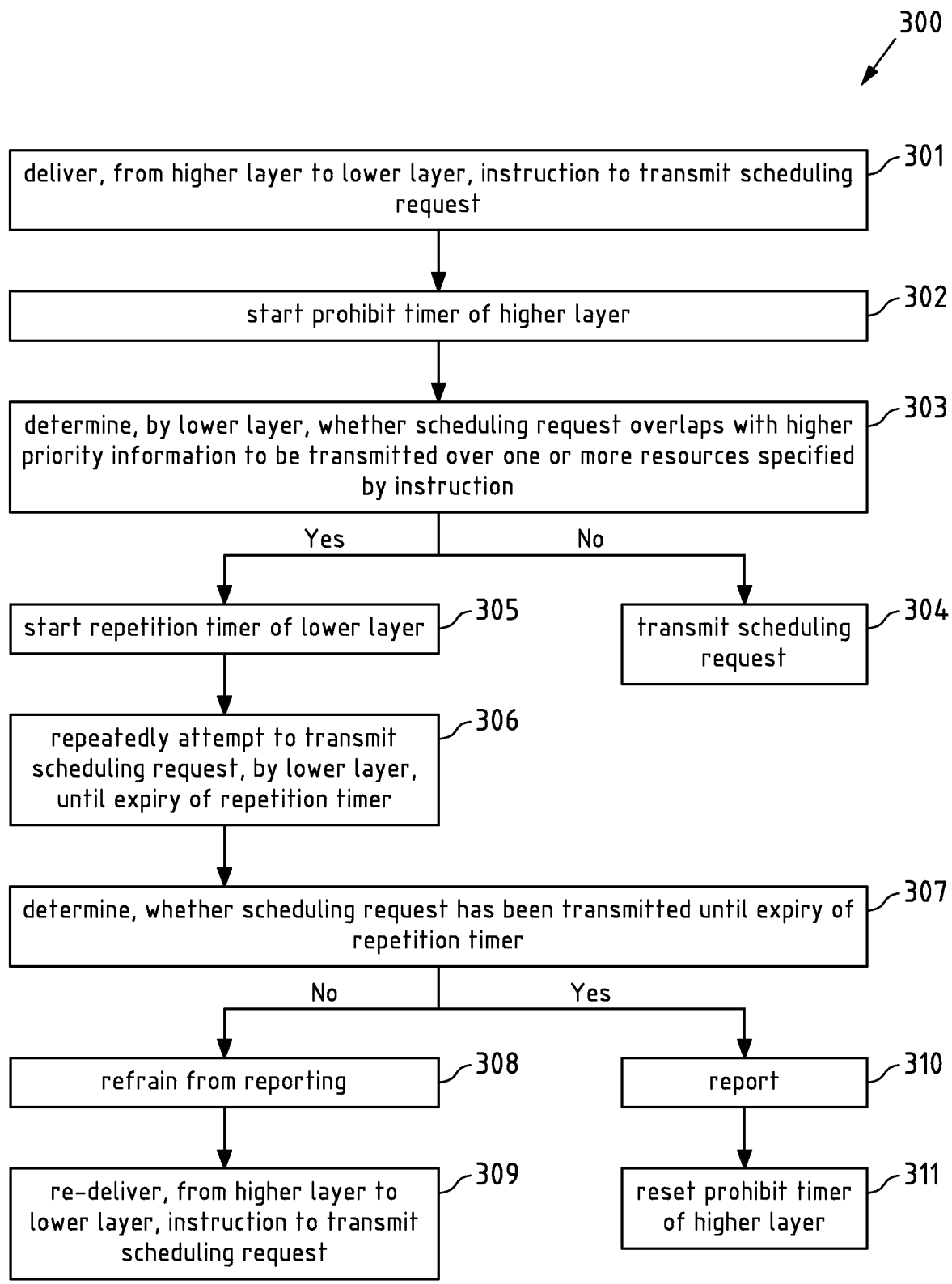
FIG. 3a, 3b are schematic flow charts of exemplary embodiments of the present disclosure.

FIG. 3a shows a schematic flow chart 300 of an exemplary embodiment of the different aspects of the present disclosure, as performed by a user equipment (such as UE 10 exemplarily shown in FIG. 1). The illustrated method comprises delivering, from the MAC layer (higher layer) to the PHY layer (lower layer), an instruction to transmit a scheduling request (action 301). This causes a prohibit timer of MAC layer to be started (action 301). It is determined, by the lower layer, whether the scheduling request overlaps with a higher priority information to be transmitted over one or more resources specified by the instruction (action 303). If there is no overlap, the scheduling request can be transmitted with resources as specified by the instruction (action 304). However, if there is an overlap such that the scheduling request cannot be transmitted with resources as specified by the instruction, a repetition timer of the lower layer is started (action 305). The defined timer at the PHY layer is in this case equal to the prohibit timer of the MAC layer. In this case, the defined repetition timer and the prohibit timer start and expire at the same time. The PHY layer repeatedly attempts to transmit the scheduling request, until expiry of the repetition timer (action 306). At some point it will be determined, whether the scheduling request has been transmitted after expiry of repetition timer (action 307).

When the defined timer expires without the PHY layer being able to transmit the scheduling request, since the prohibit timer expires at the same time, the MAC layer re-delivers the instruction to the PHY layer for transmitting the scheduling request in case the scheduling request is still pending (action 309). In this case there is no need to report anything from the PHY layer to the MAC layer (action 308).

On the other hand, if the PHY layer manages to transmit the scheduling request before the repetition timer expires, the PHY layer ends its repetition timer and informs the MAC layer that the scheduling request is transmitted (action 310), in which case the MAC layer may reset the prohibit timer (action 311) to avoid the MAC layer from re-delivering the instruction to the PHY layer, so that sufficient time is given to the base station (such as the gNB) to reply to the scheduling request.

In a variant for the latter case, instead of action 310, the PHY layer may not report to the MAC layer that the scheduling request is transmitted and the PHY layer could simply discard the scheduling request in case it is re-delivered by the MAC layer.

Generally, after step 304, it may also be reported or refrained from reporting to the higher layer, that the scheduling request has been successfully transmitted as described above.

Figure 3B:
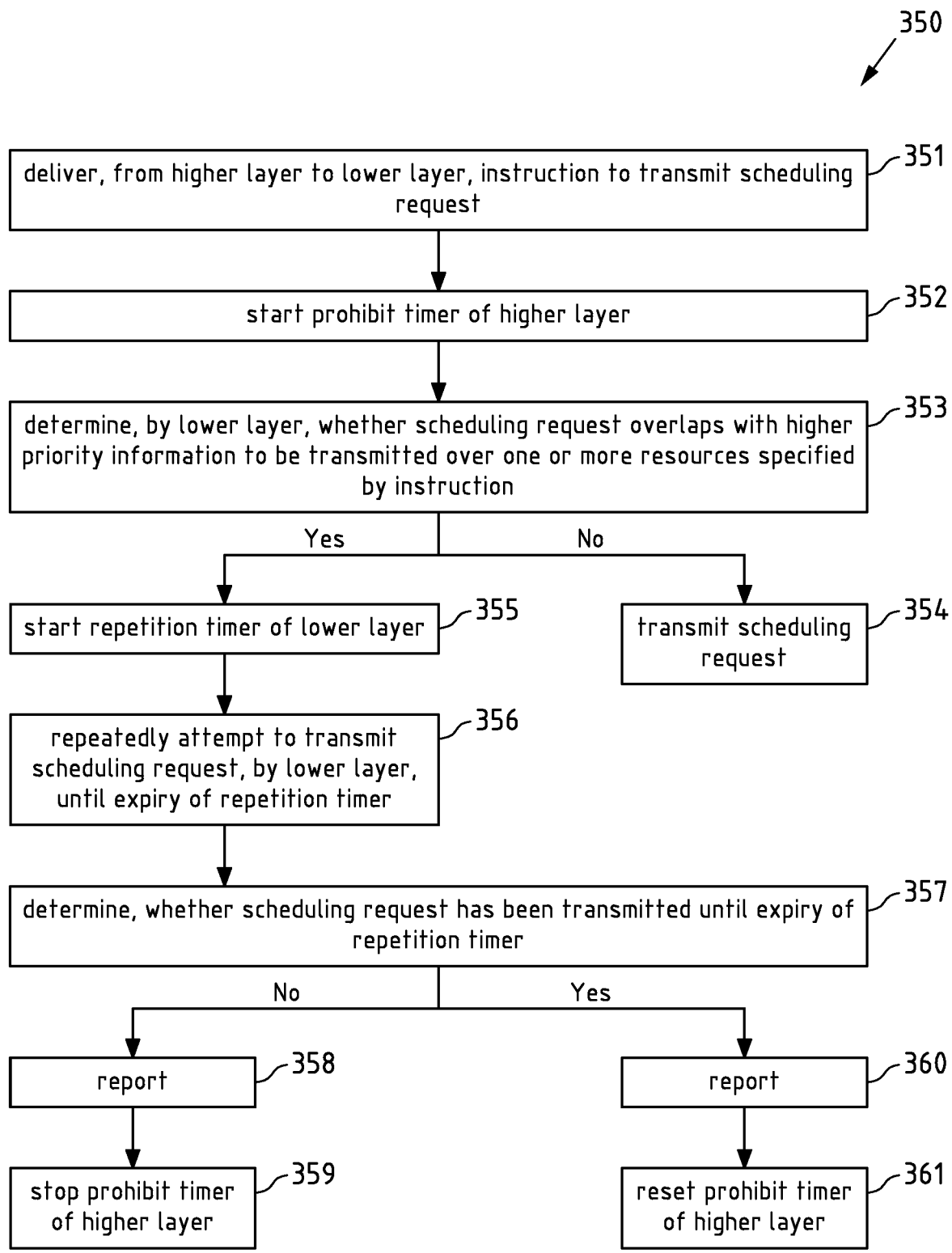

FIG. 3b shows a schematic flow chart 350 of a further exemplary embodiment of the different aspects of the present disclosure, as performed by a user equipment (such as UE 10 exemplarily shown in FIG. 1). The embodiment is the similar to the one shown in FIG. 3a and it is referred to FIG. 3a regarding actions 351-357.

In contrast to flow chart 300 of FIG. 3a, the repetition timer defined at the PHY layer is in this embodiment shorter than the prohibit timer. Similar to the previous embodiment, if on the one hand the PHY layer manages to transmit the scheduling request before the repetition timer expires, the PHY layer ends its timer and informs the MAC layer that the scheduling request is transmitted (action 360), in which case the MAC layer may again reset the prohibit timer (action 361). Again, in a variant here, the PHY layer may not report to the MAC layer that the scheduling request is transmitted and could simply discard the scheduling request in case it is re-delivered to the PHY layer.

On the other hand, and in contrast to the previous example, if the PHY layer does not manage to transmit the scheduling request before the repetition timer expires or due to prioritization at the PHY layer, then the PHY layer could inform the MAC layer that the SR is not transmitted (action 358). In this case the MAC layer may stop the prohibit timer (action 359), so that another instruction to transmit the scheduling request and thus another transmission attempt may take place before waiting for its expiry to avoid unnecessary delay in transmitting the scheduling request.

Generally, after step 354, it may also be reported to the higher layer that the scheduling request has been successfully transmitted as described above.

Alternatively or additionally, the PHY layer could be configured with a maximum number of attempts for transmission of the scheduling request. Specifically, after the MAC layer (re)delivers the instruction to the PHY layer for transmission of the scheduling request, the PHY layer may attempt to transmit the scheduling request on the corresponding scheduling request resources a configured number of times. If the PHY layer manages to transmit the scheduling request, it could inform the MAC layer that the scheduling request is transmitted. If the maximum number of attempts is reached without the PHY layer being able to transmit the scheduling request, the PHY layer could simply wait until the MAC layer re-delivers the instruction to transmit the scheduling request (in case it is still pending).

By implementing a repetition timer and repeatedly attempting to transmit the scheduling request by the PHY layer without a further instruction from the MAC layer (actions 305, 306, 355, 356), the PHY layer controls a selection of one or more resources for transmitting the scheduling request.

Figure 4:
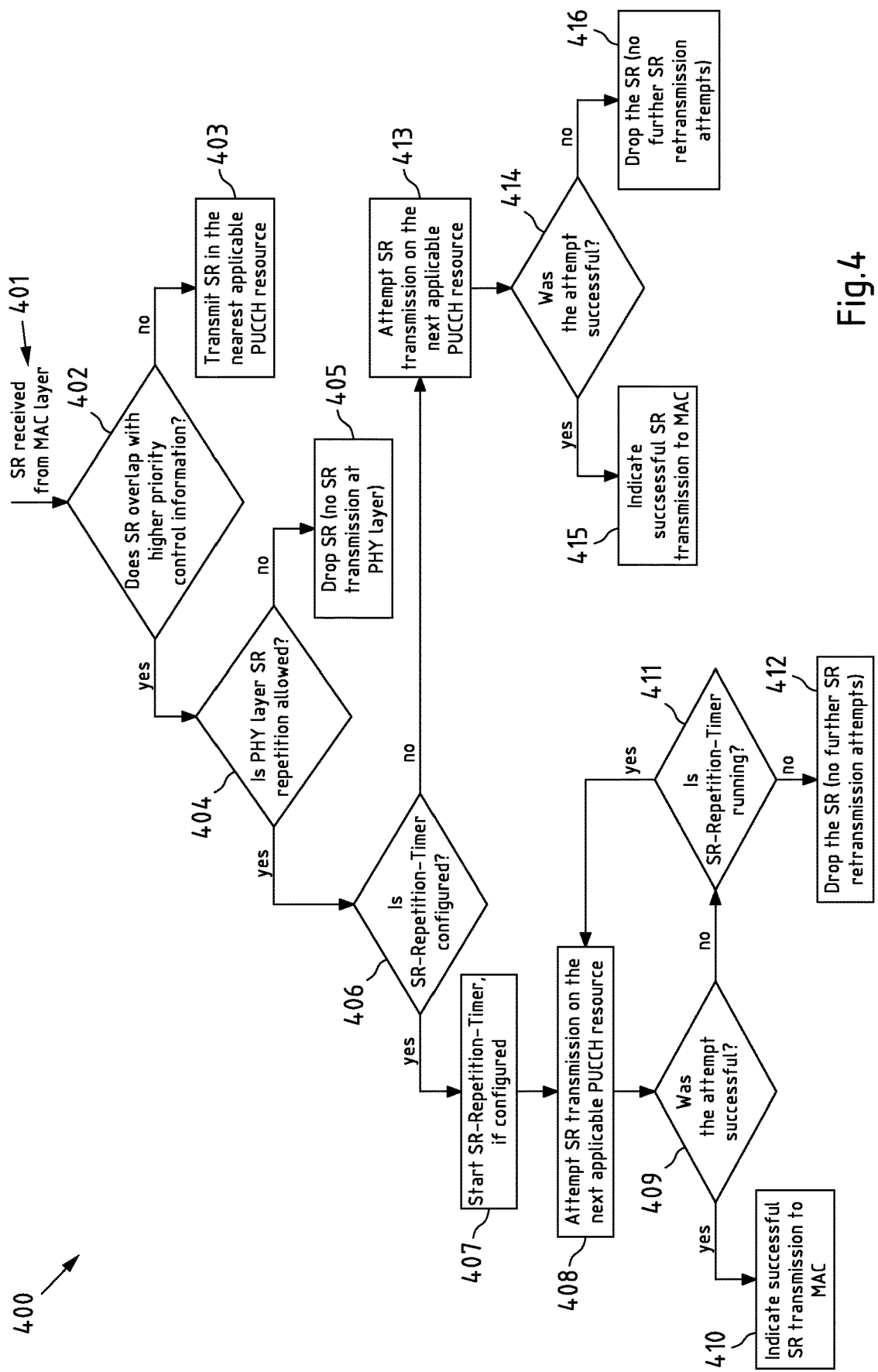
FIG. 4 is a further schematic flow chart of an exemplary embodiment of the present disclosure.

FIG. 4 presents a flow chart 400 of a further exemplary implementation of the present disclosure at the PHY layer of an UE. Generally, the implementation of FIG. 4 may also be combined with certain aspects of the implementations shown in FIGS. 3a and b. In FIG. 4, the repetition timer defined at the PHY layer is referred to as SR-Repetition-Timer.

First, the scheduling request is received from the MAC layer (action 400). It is checked, whether the scheduling request overlaps with a higher priority control information (action 402). If not, the scheduling request is transmitted in the nearest applicable PUCCH resource (action 403). An applicable resource may generally be understood to be a resource which is allowed to carry scheduling requests. Additionally or alternatively, applicable resources may be defined for specific scheduling request configurations, which may be provided by the base station, for instance. If there is an overlap, it is checked whether the PHY layer allows a repeated transmission of the scheduling request (action 404). If not, the scheduling request is dropped (action 405) and the PHY layer awaits a further instruction from the MAC layer for transmitting a scheduling request. If this is supported by the PHY layer, it is checked whether a repetition timer is configured (action 406).

If this is the case, the repetition timer is started (action 407). The PHY layer then attempts to transmit the scheduling request on the next applicable PUCCH resource (action 408), as long as the repetition timer is running (checked in action 411). If it is determined (action 409) that the attempt was successful, the successful transmission of the scheduling request is indicated to the MAC layer (action 410). If the repetition timer expires (checked in action 411), the scheduling request is dropped (action 412).

If the PHY layer allows a repeated transmission of the scheduling request but a repetition timer is not configured, the PHY layer may at least once more attempt to transmit the scheduling request on the next applicable PUCCH resource (action 412). If this additional attempt was successful (checked in action 414), the successful transmission of the scheduling request is indicated to the MAC layer (action 415). If the additional attempt was not successful (checked in action 411), the scheduling request is dropped (action 416).

Figure 5A:
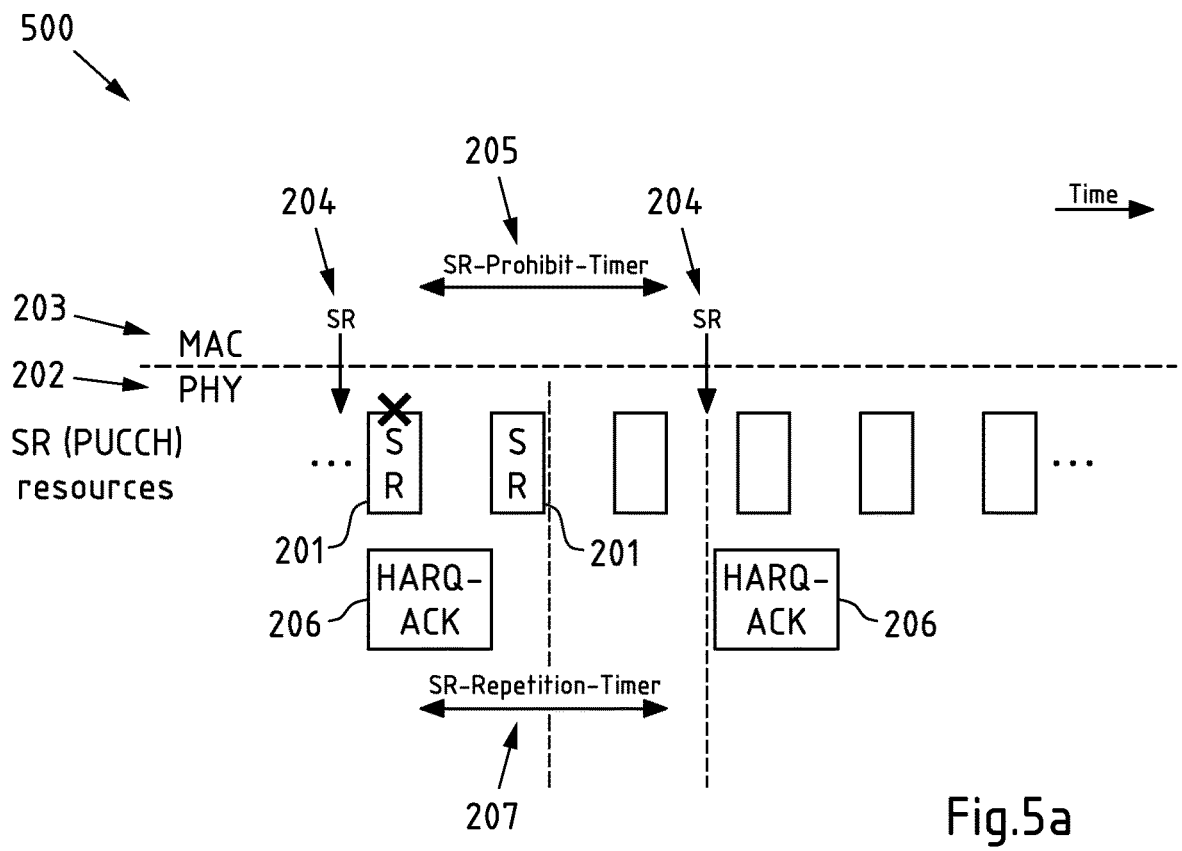
FIG. 5a, 5b are schematic diagrams of the MAC layer and physical layer of a UE illustrating an exemplary embodiment of the present disclosure, where the physical layer controls a selection of one or more resources for transmitting the scheduling request.

It is now illustrated in FIG. 5a, b, if an exemplary embodiment of the inventive concept is applied to the scenario of FIG. 2. Thus, FIG. 5a, b again show schematic diagrams of the MAC layer 203 and physical layer 202 of a UE in FIG. 5a, b, where the physical layer controls a selection of one or more resources for transmitting the scheduling request.

In the example of FIG. 5a no signalling related to the scheduling request transmission status from the PHY layer 202 to the MAC layer 203 is implemented. After the MAC layer 203 delivered the instruction 204 to transmit the scheduling request to the PHY layer 202, the PHY layer 202 attempts to transmit the scheduling request 201 in the first applicable PUCCH resource. However, due to an overlap with a HARQ-ACK transmission 206 and the prioritization of this transmission, the scheduling request transmission on that resource is dropped/cancelled. Since the PHY layer 202 is configured for controlling a selection of resources for the transmission of scheduling requests, the PHY layer 202 is provided with a repetition timer 207, which is still running. Thus, the PHY layer 202 attempts transmitting the scheduling request 201 on the next PUCCH resource and manages to transmit the scheduling request 201, because there is no overlap and thus no de-prioritization of scheduling request 201. The repetition timer 207 is stopped. As mentioned, in this example, the case is considered which does not rely on a signalling to inform the MAC layer whether the scheduling request 201 SR is transmitted. Specifically, instead of such signalling, when the MAC layer 203 re-delivers the instruction 204 to transmit the scheduling request (in case the scheduling request is still pending) to the PHY layer 202 after expiry of the prohibit timer 205, the PHY layer 202 simply discards the instruction 204 to transmit the scheduling request, since it already managed to transmit the scheduling request 201.

Figure 5B:
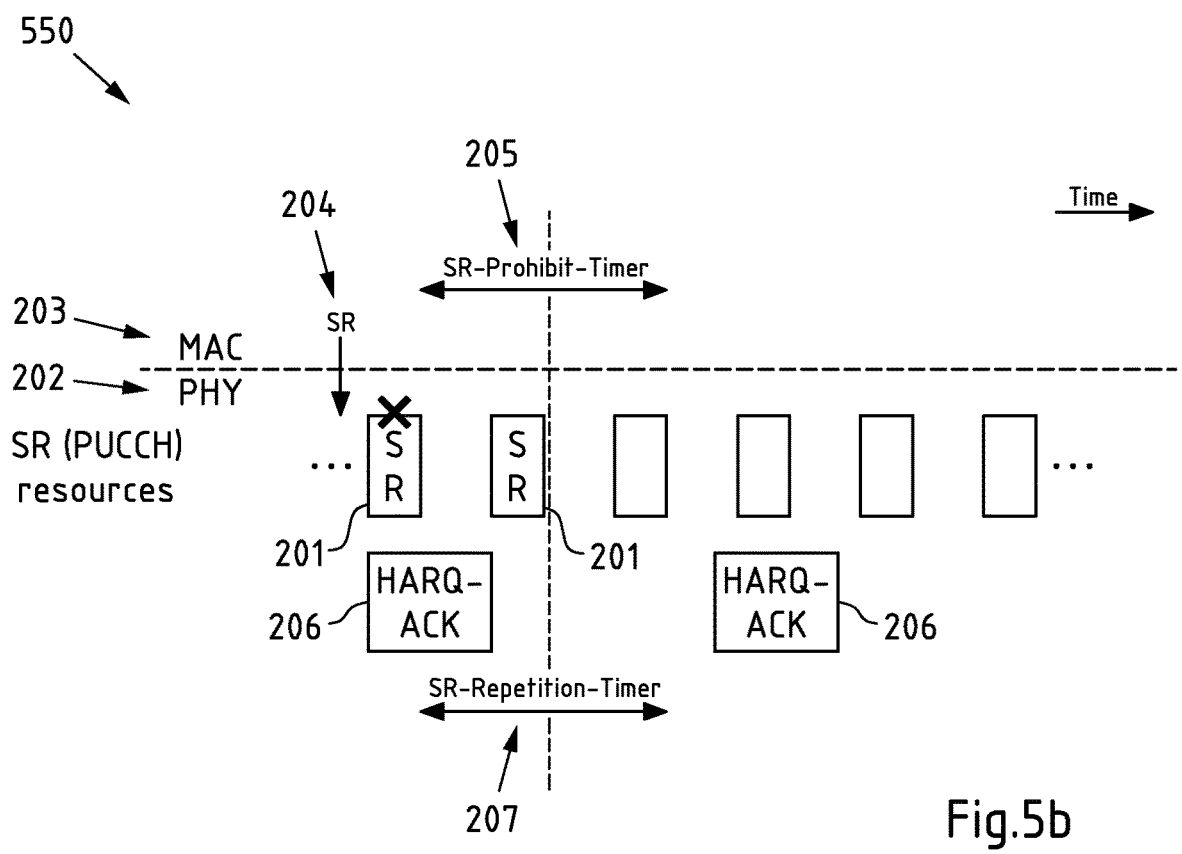

The example of FIG. 5b is similar to the example of FIG. 5a. The main difference is that in the example in FIG. 5b the case is considered where the solution relies on a signalling from the PHY layer 202 to inform the MAC layer 203 that the scheduling request 201 is transmitted. Specifically, once the PHY layer 202 manages to transmit the scheduling request 201, the PHY layer stops the repetition timer 207 and informs the MAC layer 203 that the scheduling request 201 is transmitted. The MAC layer may then use this information and react (e.g. reset the prohibit timer) as already described above.

Figure 6:
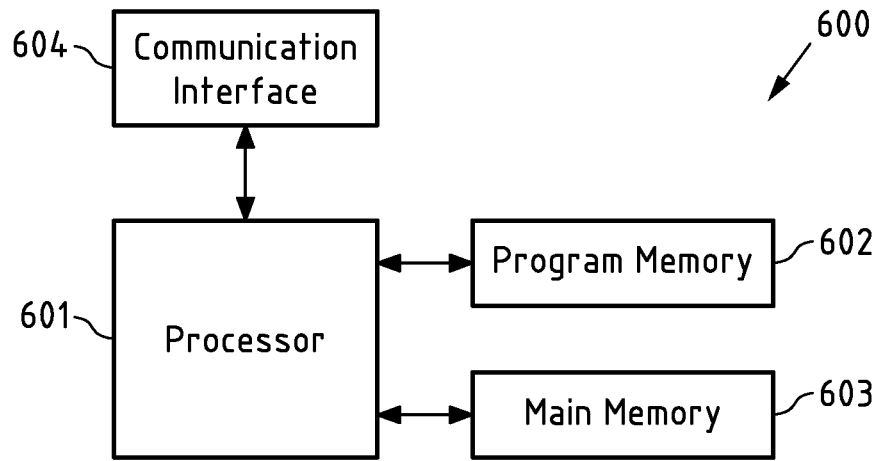
FIG. 6 is a block diagram of an exemplary embodiment of an apparatus according to the present disclosure.

FIG. 6 is a block diagram of an exemplary embodiment of an apparatus according to the present disclosure representing a UE in the form of a mobile device 600. For example, mobile device 600 may be one of a smartphone, a tablet computer, a notebook computer, a smart watch, a smart band and an IoT device.

Mobile device 600 comprises a processor 601. Processor 601 may represent a single processor or two or more processors, which are for instance at least partially coupled, for instance via a bus. Processor 601 executes a program code stored in program memory 602 (for instance program code causing mobile device 600 to perform one or more of the embodiments of a method according to the present disclosure or parts thereof, when executed on processor 601), and interfaces with a main memory 603. Program memory 602 may also contain an operating system for processor 601. Some or all of memories 602 and 603 may also be included into processor 601.

One of or both of a main memory and a program memory of a processor (e.g. program memory 602 and main memory 603) could be fixedly connected to the processor (e.g. processor 601) or at least partially removable from the processor, for instance in the form of a memory card or stick.

A program memory (e.g. program memory 602) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 603) may for instance be a volatile memory. It may for instance be a DRAM memory, to give non-limiting example. It may for instance be used as a working memory for processor 601 when executing an operating system, an application, a program, and/or the like.

Processor 601 further controls a communication interface 604 (e.g. radio interface) configured to receive and/or transmit data and/or information. For instance, communication interface 604 may be configured to transmit and/or receive radio signals from a radio node, such as a base station. It is to be understood that any computer program code based processing required for receiving and/or evaluating radio signals may be stored in an own memory of communication interface 604 and executed by an own processor of communication interface 604 or it may be stored for example in memory 603 and executed for example by processor 601.

Communication interface 604 may in particular be configured to communicate according to a cellular communication system like a 2G/3G/4G/5G or future generation cellular communication system. Mobile device 600 may use radio interface 604 to communicate with a base station, e.g. base station 20/30 depicted in FIG. 1.

Apparatus 600 the means of apparatus 600 may in particular provide a higher layer and a lower layer, as described herein and together with communication interface 604 may in particular be configured for transmitting scheduling requests to a base station according to the approach described above.

For example, the communication interface 604 may further comprise a BLE and/or Bluetooth radio interface including a BLE transmitter, receiver or transceiver. For example, radio interface 604 may additionally or alternatively comprise a WLAN radio interface including at least a WLAN transmitter, receiver or transceiver.

The components 602 to 606 of mobile device 600 may for instance be connected with processor 601 by means of one or more serial and/or parallel busses.

It is to be understood that mobile device 600 may comprise various other components. For example, mobile device 600 may optionally comprise a user interface (e.g. a touch-sensitive display, a keyboard, a touchpad, a display, etc.).

Figure 7:
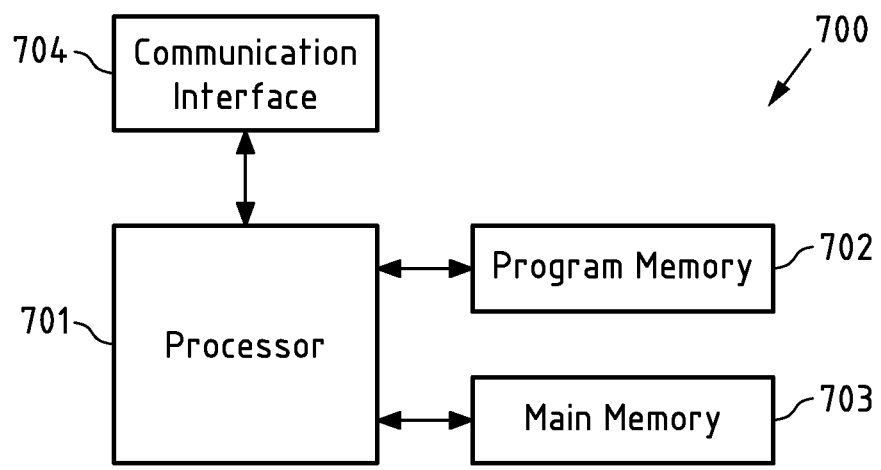
FIG. 7 is a block diagram of an exemplary embodiment of a base station.

FIG. 7 is a block diagram of an exemplary embodiment of an apparatus, such as base station 20/30 of FIG. 1. For instance, apparatus 700 may be configured for receiving and processing scheduling request sent by apparatus 600 as described above.

Apparatus 700 comprises a processor 701. Processor 701 may represent a single processor or two or more processors, which are for instance at least partially coupled, for instance via a bus. Processor 701 executes a program code stored in program memory 702 (for instance program code causing apparatus 700 to perform together with apparatus 600 embodiments according to the present disclosure or parts thereof), and interfaces with a main memory 703.

Program memory 702 may also comprise an operating system for processor 701. Some or all of memories 702 and 703 may also be included into processor 701.

Moreover, processor 701 controls a communication interface 704 which is for example configured to communicate according to a cellular communication system like a 2G/3G/4G/5G cellular communication system. Communication interface 704 of apparatus 700 may be realized by radio heads 30 for instance and may be provided for communicate between base station 20/30 and UE 10 in FIG. 1.

The components 702 to 705 of apparatus 700 may for instance be connected with processor 701 by means of one or more serial and/or parallel busses.

It is to be understood that apparatuses 600, 700 may comprise various other components.

Figure 8:
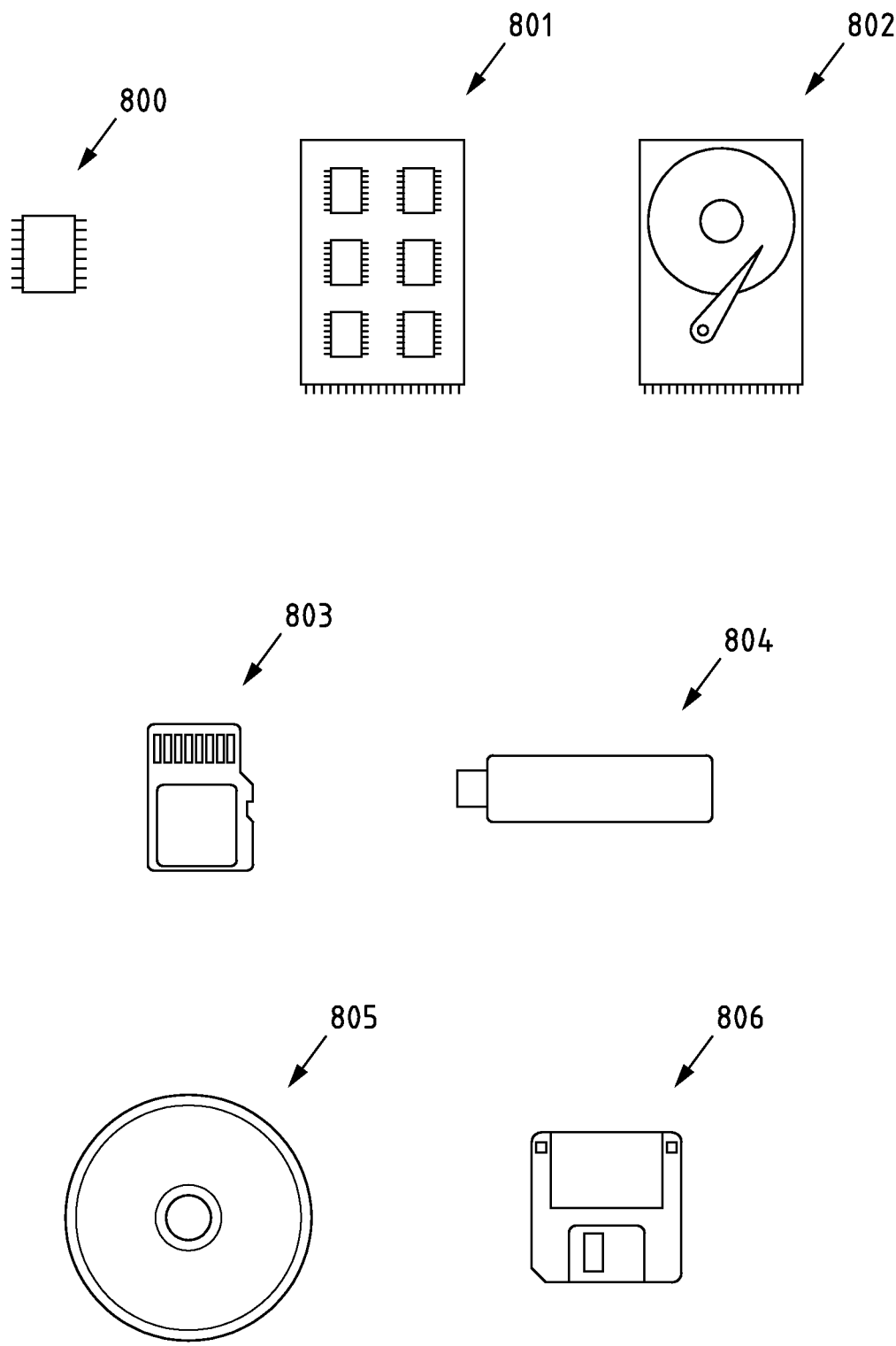
FIG. 8 is a schematic illustration of examples of tangible and non-transitory computer-readable storage media.

FIG. 8 is a schematic illustration of examples of tangible and non-transitory computer-readable storage media according to the present disclosure that may for instance be used to implement memory 602 of FIG. 6 or memory 702 of FIG. 7. To this end, FIG. 8 displays a flash memory 800, which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 601 and 701 of FIGS. 6 and 7, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that the embodiments disclosed herein are only exemplary, and that any feature presented for a particular exemplary embodiment may be used with any aspect of the present disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. An apparatus comprising:
   at least one processor; and
   at least one memory including computer program code, the at least one memory and the computer program code are configured to, with the at least one processor, cause the apparatus at least to:
   deliver, from a higher layer to a lower layer, an instruction to transmit a scheduling request, wherein the instruction to transmit the scheduling request specifies one or more resources to be used for transmitting the scheduling request;
   determine, by the lower layer, whether the scheduling request overlaps with a higher priority information to be transmitted over the one or more resources specified by the instruction; and
   at least partially control, by the lower layer, a selection of one or more resources for transmitting the scheduling request, wherein the lower layer comprises a timer for controlling of the selection of the one or more resources for transmitting the scheduling request,
   wherein the timer of the lower layer is defined based on at least a timer of the higher layer and the timer of the lower layer is started based on a determination that the scheduling request overlaps with the higher priority information to be transmitted over the one or more resources specified by the instruction.

2. The apparatus according to claim 1, wherein one or more of
   the higher layer is a data link layer;
   the lower layer is a physical layer; or
   the one or more resources for transmitting the scheduling request belong to a physical uplink channel.

3. The apparatus according to claim 1, wherein one or more of
   the apparatus is a user equipment or a part thereof; or
   the scheduling request is directed to a network node.

4. The apparatus according to claim 1, wherein the controlling of the selection of the one or more resources for transmitting the scheduling request allows for attempting, by the lower layer, to transmit the scheduling request on more than one resource.

5. The apparatus according to claim 1, wherein the controlling of the selection of the one or more resources for transmitting the scheduling request comprises postponing or re-attempting, by the lower layer, the transmission of the scheduling request.

6. The apparatus according to claim 1, wherein the timer of the lower layer is a repetition timer and wherein the controlling of the selection of the one or more resources for transmitting the scheduling request comprises attempting, by the lower layer, to transmit the scheduling request until an expiry of the repetition timer.

7. The apparatus according to claim 6, wherein the timer of the higher layer is a prohibit timer for temporarily prohibiting re-delivering, from the higher layer to the lower layer, the instruction to transmit the scheduling request.

8. The apparatus according to claim 1, further caused to:
   refraining, by the higher layer, from incrementing a counter for counting the number of times of delivering the instruction for transmission of the scheduling request to the lower layer until it is reported, by the lower layer to the higher layer, that the scheduling request has been transmitted.

9. The apparatus according to claim 1, further caused to:
   in case it is reported, by the lower layer to the higher layer, that the scheduling request has not been transmitted, decrementing, by the higher layer, a counter for counting the number of times of delivering the instruction for transmission of the scheduling request to the lower layer.

10. A method, performed by at least one apparatus, the method comprising:
    delivering, from a higher layer to a lower layer, an instruction to transmit a scheduling request, wherein the instruction to transmit the scheduling request specifies one or more resources to be used for transmitting the scheduling request;
    determining, by the lower layer, whether the scheduling request overlaps with a higher priority information to be transmitted over the one or more resources specified by the instruction; and
    at least partially controlling, by the lower layer, a selection of one or more resources for transmitting the scheduling request, wherein the lower layer comprises a timer for controlling of the selection of the one or more resources for transmitting the scheduling request,
    wherein the timer of the lower layer is defined based on at least a timer of the higher layer and the timer of the lower layer is started based on a determination that the scheduling request overlaps with the higher priority information to be transmitted over the one or more resources specified by the instruction.

11. The method according to claim 10, wherein the scheduling request is a scheduling request for allocating one or more resources for an uplink transmission.

12. The method according to claim 10, wherein the controlling of the selection of the one or more resources for transmitting the scheduling request allows for attempting, by the lower layer, to transmit the scheduling request on more than one resource.

13. The method according to claim 10, wherein the timer of the lower layer is a repetition timer and wherein the controlling of the selection of the one or more resources for transmitting the scheduling request comprises attempting, by the lower layer, to transmit the scheduling request until an expiry of the repetition timer.

14. The method according to claim 13, wherein the timer of the higher layer is a prohibit timer for temporarily prohibiting re-delivering, from the higher layer to the lower layer, the instruction to transmit the scheduling request, and wherein one or more of
- the repetition timer of the lower layer is substantially equal to the prohibit timer of the higher layer;
- the repetition timer of the lower layer is shorter than the prohibit timer of the higher layer;
- the repetition timer of the lower layer starts substantially at the same time as the prohibit timer of the higher layer; or
- the repetition timer of the lower layer ends substantially at the same time as the prohibit timer of the higher layer.

15. The method according to claim 10, further comprising:
- refraining, by the higher layer, from incrementing a counter for counting the number of times of delivering the instruction for transmission of the scheduling request to the lower layer until it is reported, by the lower layer to the higher layer, that the scheduling request has been transmitted.

16. The method according to claim 10, further comprising:
- in case it is reported, by the lower layer to the higher layer, that the scheduling request has not been transmitted, decrementing, by the higher layer, a counter for counting the number of times of delivering the instruction for transmission of the scheduling request to the lower layer.

17. A non-transitory memory including a computer program, the computer program when executed by a processor of an apparatus causing said apparatus to:
- deliver, from a higher layer to a lower layer, an instruction to transmit a scheduling request, wherein the instruction to transmit the scheduling request specifies one or more resources to be used for transmitting the scheduling request;
- determine, by the lower layer, whether the scheduling request overlaps with a higher priority information to be transmitted over the one or more resources specified by the instruction; and
- at least partially control, by the lower layer, a selection of one or more resources for transmitting the scheduling request, wherein the lower layer comprises a timer for controlling of the selection of the one or more resources for transmitting the scheduling request,
- wherein the timer of the lower layer is defined based on at least a timer of the higher layer and the timer of the lower layer is started based on a determination that the scheduling request overlaps with the higher priority information to be transmitted over the one or more resources specified by the instruction.

18. The non-transitory memory including the computer program according to claim 17, wherein the timer of the lower layer is a repetition timer and wherein the controlling of the selection of the one or more resources for transmitting the scheduling request comprises attempting, by the lower layer, to transmit the scheduling request until an expiry of the repetition timer.

19. The non-transitory memory including the computer program according to claim 18, wherein the higher layer comprises a prohibit timer for temporarily prohibiting re-delivering, from the higher layer to the lower layer, the instruction to transmit the scheduling request, and wherein the repetition timer of the lower layer is defined at least based on the prohibit timer of the higher layer.

* * * * *